United States Patent [19]

Richards

[11] Patent Number: 4,491,357

[45] Date of Patent: Jan. 1, 1985

[54] ASH SEPARATING SHOVEL

[76] Inventor: George A. Richards, 424 Central St., West Action, Mass. 01720

[21] Appl. No.: 558,990

[22] Filed: Dec. 7, 1983

[51] Int. Cl.[3] .......... A01B 1/02

[52] U.S. Cl. .......... 294/49; 294/9

[58] Field of Search .......... 294/49, 9, 50, 51, 57, 294/59, 60; 209/417, 418, 419

[56] References Cited

U.S. PATENT DOCUMENTS 1,165,574 12/1915 Davidson .......... 294/49

1,353,307 9/1920 Berger .......... 294/49

*Primary Examiner*—James B. Marbert

*Attorney, Agent, or Firm*—Richard L. Miller

[57] ABSTRACT

An ash separating shovel is provided and consists of a tapered body member that has a diagonal ribbed reticulated middle portion. The body member is folded along two lines with inwardly diagonal ribs of the reticulated middle portion to form side walls and a bottom wall.

8 Claims, 3 Drawing Figures

ASH SEPARATING SHOVEL

BACKGROUND OF THE INVENTION

The instant invention relates generally to shovels and more specifically it relates to an ash separating shovel.

Numerous shovels have been provided in prior art that are adapted to separate ashes from hot coals. For example, U.S. Pat. Nos. 1,007,566; 1,165,574 and 1,453,583 all are illustrative of such prior art. While these units may be suitable for the particular purpose to which they address, they would not be as suitable for the purposes of the present invention as heretofore described.

SUMMARY OF THE INVENTION

A principle object of the present invention is to provide an ash separating shovel that has a tapered body member folded along two lines with inwardly diagonal ribs of a reticulated middle portion to form side walls and a bottom wall.

Another object is to provide an ash separating shovel that has a body member having a narrow front portion being tapered upwardly from fold line to top edge so that when side walls are formed the front edge will be perpendicular to the bottom wall.

An additional object is to provide an ash separating shovel that is fabricated from expanded metal and sheet metal.

A further object is to provide an ash separating shovel that is simple and easy to use.

A still further object is to provide an ash separating shovel that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENT

Figure 1:
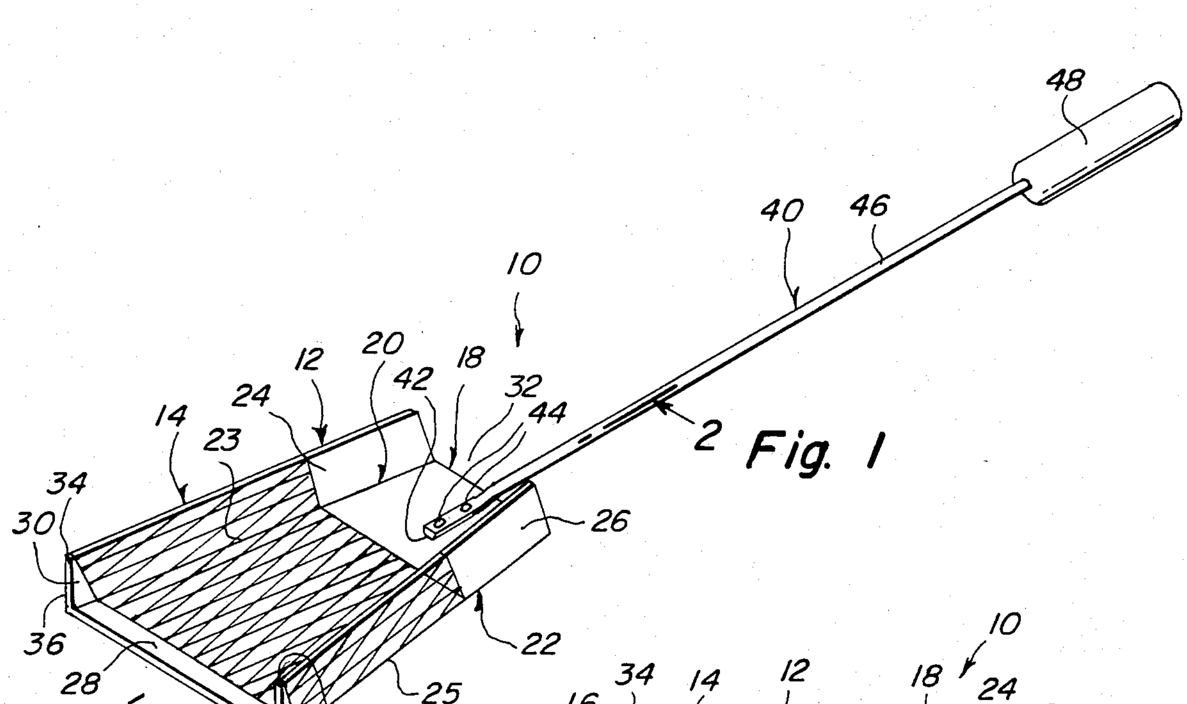
FIG. 1 is a perspective view of the invention.
Figure 2:
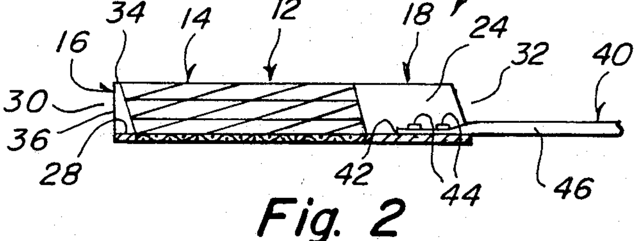
FIG. 2 is a cross sectional view taken on line 2—2 of FIG. 1.

Turning now descriptively to the drawings, in which similar reference characters denote similar elements throughout the several views, FIGS. 1 and 2 illustrates an ash separating shovel 10 that consists of a tpered body member 12 that has a diagonal ribbed reticulated middle portion 14, a narrow front portion 16 and a wide rear portion 18. The body member 12 is folded on sides 20,22 along inwardly diagonal ribs 23,25 of the reticulated middle portion 14 to form side walls 24,26 and a bottom wall 28 with a wide open front 30 and a narrow open rear 32.

The narrow front portion 16 is tapered upwardly from fold lines 20,22 to top edges 34,34 so that when the side walls 24,26 are formed the front edges 36,36 of the side walls will be perpendicular to the bottom wall 28.

The diagonal ribbed reticulated middle portion 14 is fabricated from expanded metal 16 to 18 gauge having $\frac{3}{8}$"×$\frac{3}{4}$" diamond openings 38. The narrow front portion 16 and wide rear portion 18 are fabricated from sheet metal of 24 gauge and are affixed to the middle portion 14 by welding or the like.

The ash separating shovel 10 further contains a handle 40 affixed to center 42 of the bottom wall 28 on the wide rear portion 18 through the narrow open rear 32 by rivets 44 or other fastening methods. The handle consists of an elongated $\frac{3}{8}$" diameter steel rod 46 and a hand grip 48 attached to free end of the rod. The hand grip 48 is fabricated from wood or metal.

Figure 3:
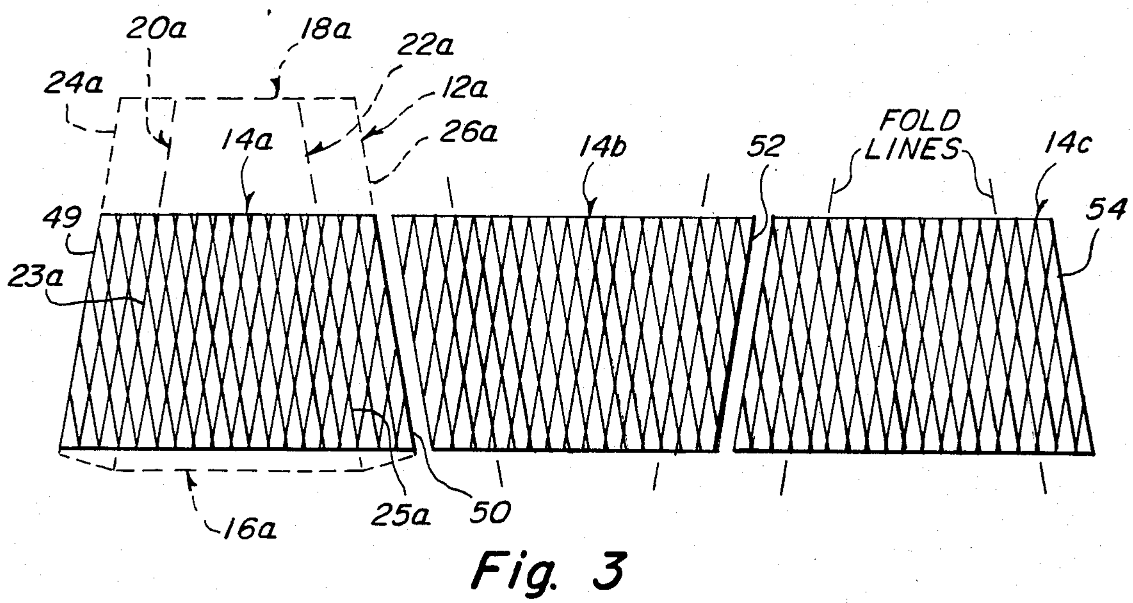
FIG. 3 is a flat plan view of a sheet of perforated material showing how it is cut and folded to fabricate the grate portion of the invention.

FIG. 3 shows how a series of diagonal ribbed reticulated middle portions **14*a*, 14*b*, and 14*c* are formed and folded from an elongated sheet of extended metal. The first middle portion 14 is cut along inwardly diagonal ribs 49,50. After the narrow front portion 16*a* and wide rear portion 18*a* are attached, as shown in dotted lines, the first middle portion 14*a* can be folded along the inwardly diagonal ribs 23*a*, 25*a* to form part of the fold line 20*a*, 22*a* of the side wall 24*a*, 26*a* of the first tapered body member 12*a*. The second middle portion 14*b* is cut along an inwardly diagonal rib 54. Note that the second middle portion 14*b* is formed in the opposite direction than the first and third middle portions 14*a* and 14*c***. This reduces the waste-factor in using the extended metal sheet. While only three middle portions are illustrated it is to be understood that any number of middle portions could be so adjacent to each other.

The above steps are taken to form the second tapered body member and third tapered body member.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An ash separating shovel which comprises a tapered body member having a diagonal ribbed reticulated middle portion in the shape of a trapezoid, a narrow front portion of solid material extending along the wide end of the trapezoidal shaped middle portion, and a wide rear portion of solid material extending along the narrow end of the trapezoidal shaped middle portion, said front, middle and rear porions being continuous along a common plane, said rear portion having side edges which continue the side edges of the trapezoidal middle portion, said body member folded along two said diagonal ribs of the reticulated middle portion to form side walls of uniform height along the sides of the entire body member, and a bottom wall with a wide open front and a narrow open rear, wherein the narrow front portion has tapered edges from the fold line to the corners and the wide end of the trapezoidal middle portion, so that when the side walls are formed the front ends of the side walls will be perpendicular to the bottom wall.

2. An Ash separating shovel as recited in claim 1 wherein the diagonal ribbed reticulates middle portion is fabricated from expanded metal 16 to 18 gage having $\frac{3}{8}$" to $\frac{3}{4}$" diamond openings.

3. An ash separating shovel as recited in claim 2 wherein the narrow front portion and a wide rear portion are fabricated from sheet metal of 24 gage.

4. An ash separating shovel as recited in claim 3 that further comprises a handle affixed to center of the bottom wall on the wide rear portion through the narrow open rear.

5. An ash separating shovel as recited in claim 4 wherein the handle comprises:

(a) an elongated $\frac{3}{8}''$ diameter steel rod; and (b) a hand grip attached to free end of said rod.

6. An ash separating shovel as recited in claim 5 wherein said hand grip is fabricated from wood.

7. An ash separating shovel as recited in claim 4 wherein said hand grip is fabricated from metal.

8. An ash separating shovel as recited in claim 1, wherein said trapezoidal shaped middle section is cut from an elongated sheet of reticulated material with an adjacent section of the sheet being available for an additional shovel by being cut in the opposite diagonal orientation.

* * * * *